United States Patent [19]
Vogt et al.

[11] Patent Number: 5,945,035
[45] Date of Patent: Aug. 31, 1999

[54] CONDUCTIVE PIGMENTS

[75] Inventors: Reiner Vogt, Kranichstein; Gerhard Pfaff, Munster, both of Germany

[73] Assignee: Merck Patent Gesellschaft Mit Beschrankter Haftung, Germany

[21] Appl. No.: 08/970,351

[22] Filed: Nov. 14, 1997

[30] Foreign Application Priority Data

Nov. 16, 1996 [JP] Japan .............................. 196 47 539

[51] Int. Cl.⁶ .............................. H01B 1/08; H01B 1/20; C01B 13/32
[52] U.S. Cl. .................... 252/520.1; 252/520.21; 423/71; 423/85; 423/92; 423/275
[58] Field of Search .......................... 252/520.1, 520.21; 423/71, 85, 92, 275

[56] References Cited

U.S. PATENT DOCUMENTS

| | | | |
|---|---|---|---|
| 5,350,448 | 9/1994 | Dietz et al. | 106/441 |
| 5,472,640 | 12/1995 | Brueckner et al. | 252/518 |
| 5,565,144 | 10/1996 | Feist et al. | 252/518 |
| 5,569,412 | 10/1996 | Feist et al. | 252/518 |
| 5,571,456 | 11/1996 | Bergmann et al. | 252/518 |
| 5,720,904 | 2/1998 | Jones | 252/518 |
| 5,776,239 | 7/1998 | Bruno | 106/437 |

OTHER PUBLICATIONS

Derwent Abstract of DE 4 435 301, Oct. 1994 Abstract.
Derwent Abstract of EP 587,102, Sep. 1993 Abstract.
Derwent Abstract of JP 63 45 430 A, Jun. 1993 Abstract.

*Primary Examiner*—Mark Kopec
*Attorney, Agent, or Firm*—Millen, White, Zelano, & Branigan, P.C.

[57] ABSTRACT

The invention relates to electrically conductive pigments which as a conductive layer on a platelet-shaped or needle-shaped substrate have a niobium- and/or tantalum-doped tin oxide or titanium dioxide layer.

16 Claims, No Drawings

CONDUCTIVE PIGMENTS

The invention relates to electrically conductive pigments which have, as a conductive layer on a platelet- or needle-shaped substrate, a tin oxide or titanium dioxide layer doped with niobium and/or tantalum.

BACKGROUND OF THE INVENTION

In many areas of the art there is a need for conductive pigments with which, for example, electrically conductive plastics, paints, coatings, fibers or the like, which provide shielding from antistatic or electromagnetic waves, can be prepared. Conductive carbon black is employed in large amounts for this purpose, but because of its high light absorption it cannot be employed for pale or colored coatings.

Another disadvantage is the high absorption of carbon black in the IR range, which leads to an in many cases unwanted heating of the coated articles in sunlight, for example.

EP 0 373 575 discloses conductive platelet-shaped pigments which have as conductive layer an antimony-doped tin oxide, a thin layer of silicon dioxide being arranged between the conductive layer and the substrate. The application of an additional layer to the substrate means a considerably increased outlay for the preparation and makes the pigment more expensive.

DE 42 13 747 A1 describes conductive pigments which have, as conductive layer on a substrate, a halogen-doped tin oxide and/or titanium dioxide layer.

Substrates having a phosphorus-doped tin oxide layer are known from DE-A 44 35 301.

However, the conductive pigments of the prior art are not sufficiently opaque and therefore not suitable for preparing decorative coatings. Furthermore, the pigments have conductivity values which do not meet all the high requirements.

There was therefore a need for stable, electrically conductive pigments which are opaque and which impart not only conductivity but also a decorative appearance to coatings or plastics.

EP 0 587 102 discloses the coating of barium sulfate with a niobium- or tantalum-doped tin dioxide layer.

In JP H6-345 430, tin dioxide particles are doped with from 0.1 to 10% by weight of pentavalent niobium or tantalum.

WO 96/06437 discloses electrically conductive powders comprising doped tin dioxide powder.

The coating of platelet- or needle-shaped substrates with an electrically conductive doped tin oxide or titanium dioxide layer, however, is not described in the prior art.

SUMMARY OF THE INVENTION

It has surprisingly now been found that coating substrates with a niobium- and/or tantalum-doped tin oxide or titanium dioxide layer leads to pale, decorative, conductive pigments having none of the above disadvantages.

The invention therefore provides conductive pigments notable in that such a substrate is coated with a conductive layer, the conductive layer being a niobium- and/or tantalum-doped tin oxide or titanium dioxide layer.

The invention also provides a process for preparing the novel conductive pigments, which is characterized in that an aqueous substrate suspension is prepared, and, simultaneously, a hydrolyzable tin salt or titanium salt solution and an aqueous niobium compound and/or tantalum compound are added, the pH of the substrate suspension being maintained, by simultaneous addition of a base or of an acid, within a range which brings about the hydrolysis of the tin salt or titanium salt and the hydrolysis of the niobium salt and/or tantalum salt, and the substrate coated in this way is separated off, washed, dried and calcined at temperatures of 200–1100° C. in the absence of oxygen.

Upon further study of the specification and appended claims, further objects and advantages of this invention will become apparent to those skilled in the art.

Substrates which can be employed are both platelet-shaped and needle-shaped particles, and mixtures thereof. All known platelet-shaped carrier materials, for example metals, metal oxides, mica pigments and synthetic platelets, can be coated by the novel process. Examples thereof are natural or synthetic mica, other phyllosilicates, such as talc, kaolin or sericite, or other comparable materials, platelet-shaped iron oxide, aluminum flakes, bismuth oxychloride, and $SiO_2$, $TiO_2$, $Al_2O_3$ and glass flakes. Examples of needle-shaped substrates include, for example, glass fibers and $\alpha$-$Fe_2O_3$.

Since high forces of gravity are not required in the process, the process is also outstandingly suitable for the coating of pearl luster pigments. All customary pearl luster pigments can be used, for example mica coatings with colored or colorless metal oxides, such as $TiO_2$, $Fe_2O_3$, $SnO_2$, $Cr_2O_3$, ZnO and patent applications 14 67 468, 19 59 998, 20 09 566, 22 14 545, 22 15 191, 22 44 298, 23 13 331, 25 22 572, 32 11 602 and 32 35 017 and are obtainable commercially, for example, under the trade name Iriodin® from the company Merck KGaA, Darmstadt.

The particles preferably have a mean diameter of less than 200 μm and, in particular, not more than 50 μm. Platelet-shaped substrates preferably have an extent of less than 500 μm in the principle dimension, and in particular less than 250 um, and the thickness is preferably less than 10 μm, particulary preferably not more than 5 um, and is in particular in the range of 0.1–1 μm. The ratio of the extent in the principal dimension to the thickness (aspect ratio) for the platelet-shaped substrates preferably is more than 3 and, in particular, more than 5.

The substrates to be coated can also consist of a mixture of platelet-shaped particles with needle-shaped and/or spherical particles, the ratio of platelet-shaped to needle-shaped or spherical preferably being in the range from 80:20 to 20:80 and, in particular, 50:50.

In accordance with the invention, the substrates are suspended in water and the solution of a water-soluble tin salt or titanium salt and of a water-soluble niobium compound and/or tantalum compound is added, preferably at elevated temperature, for example 50–90° C., and at a suitable pH, for example 1–5, the pH being maintained within the suitable range, if appropriate, by simultaneous addition of an acid or base.

Use can be made judiciously of the bases which are readily obtainable industrially, such as NaOH, KOH or ammonia, for example, and of the acids of dilute mineral acids. Since the bases and acids serve only to change the pH, their nature is not critical, so that other acids and bases can also be employed.

Suitable water-soluble titanium, niobium and tantalum compounds are preferably the sulfates, nitrates and halides, especially the chlorides, thereof.

Suitable tin salts are preferably the 2- and 4-valent halides, sulfates or nitrates, preferably the halides, and especially the chlorides. Particular preference is given to a tin salt solution consisting of $SnCl_4$ and $SnCl_2$, where the ratio of $Sn^{IV}$ to $Sn^{II}$ is in the range from 90:10 to 10:90, in particular from 80:20 to 60:40; preference is also given to solutions containing only tin (IV) salts. The tin salts can also be added in solid form to the aqueous substrate suspension.

Preference is given to a conductive layer of niobium- and/or tantalum-doped tin oxide or titanium dioxide, which is applied in an amount of about 25–100% by weight, based on the substrate, in particular in an amount of 50–75% by weight. Larger amounts, although possible per se, do not provide any further increase in conductivity, and the pigments become increasingly darker. In the conductive layer the proportion of tantalum and/or niobium relative to tin or titanium is preferably 0.1–20 atom %, more preferably 1–10 atom % and, in particular 2–8 atom % based on the number of metal atoms. If the niobium or tantalum content is too low it is not possible to achieve high conductivities, while in the case of an excessive niobium or tantalum content there is a drastic decrease in conductivity.

The desired homogeneous distribution of tin or titanium and niobium and/or tantalum in the conductive pair is preferably readily achieved by metering the tin compounds or titanium compounds and niobium compounds and/or tantalum compounds in water, either together in one solution or in two separate solutions, continuously and in the predetermined mixing ratio, into the substrate suspension at a suitable pH of from about 1 to 5 and at a suitable temperature of from about 50 to 90° C., in such a way that hydrolysis and deposition on the substrate takes place immediately in each case.

The metal salts can be precipitated using any acid or base. The optimum concentrations and pH values can be determined by means of routine experiments. Normally, once established for the precipitation, the pH is maintained throughout the precipitation in order to obtain uniform pigments.

After the end of coating, the pigments are separated off the suspension, washed, dried and calcined at temperatures preferably of 200–1100° C., more preferably at 600–1000° C., in the absence of oxygen for from 15 min to 5 h, for example. Depending on the choice of starting material and the layer thickness of the doped tin oxide or titanium dioxide layer, the novel pigments are cream-colored, yellowish or light gray.

In addition to niobium and/or tantalum the conductive tin oxide or titanium dioxide layer may also comprise further metal oxides. They are added in amounts such that they do not influence the conductivity or specific resistance of the outer layer. The addition of antimony in particular has proved extremely positive.

Preferred embodiments comprise a tin oxide or titanium dioxide layer doped with:
  niobium,
  tantalum,
  niobium and tantalum,
  niobium and antimony
  tantalum and antimony,
  niobium, tantalum and antimony.

The ratio of niobium to tantalum or of niobium or tantalum to antimony is preferably from 1:0 to 0:1, more preferably 1:1. The niobium and tantalum dopants may exist in the layer as oxides and/or mixed metal oxides, for example, $SnNbO_x$ or $S_nTaO_x$.

Where the dope consists of three components, for example, niobium, tantalum and antimony are employed in a ratio of 1:1:1, preferably 1:1:5, in particular 1:1:10.

For example, therefore, it may be advantageous to add further metal oxides, for example aluminum oxide, iron oxide, zirconium oxide or chromium oxide, to this outer layer in order to increase the thermal and/or mechanical stability or to produce special color effects. Since these additions generally increase the specific resistance of the pigments, the chosen proportion thereof by mass in the outer layer is preferably not too high, and is less than 25% by weight. Particular preference is given to pigments in which such additions make up less than 10% by weight and, in particular, less than 5% by weight for the pigment.

The niobium- and/or tantalum-doped tin oxide or titanium dioxide layer gives the novel pigments a high conductivity, and the specific resistance is in general preferably from $1 \cdot 10^4$ to $1 \cdot 10^8$ $\Omega \cdot cm$, depending on the composition of the outer layer.

In addition to the high electrical conductivity, the novel pigments are notable for a covering power which can be optimized in respect of the particular application and for an optimizable coloredness. Depending on their specific embodiment, the novel pigments can be used for a whole range of different applications, such as for transparent electrodes for driving, for example, liquid-crystal displays, for antistatic coatings or for antistatic plastics, floor coverings, etc. In addition they are useful in paints, varnishes, printing inks and plastics.

The invention therefore likewise provides formulations which comprise the novel pigments. The conductive pigments can also be mixed with other pigments, for example pearl luster pigments, color pigments and spherical particles. The novel pigments are often better than conventional pigments in meeting the requirements which arise in connection with the respective applications, and in any case constitute a considerable broadening of the pool of such pigments which is available to the skilled worker. The novel pigments are thus of considerable economic importance.

The possible uses listed for the novel pigments are to be understood only as examples and are intended merely to illustrate the invention without limiting it. However, whatever the specific profile of requirements for a certain application, the skilled worker is able to vary the properties of the pigments within a wide range and optimize them in respect to the particular applications.

The entire disclosure of all applications, patents and publications, cited above and below, and of corresponding German application No. 196 47 539.2, filed Nov. 16, 1996 is hereby incorporated by reference.

The examples which follow are intended to illustrate the invention without limiting it.

EXAMPLES

In the foregoing and in the following examples, all temperatures are set forth uncorrected in degrees Celsius; and, unless otherwise indicated, all parts and percentages are by weight.

Example 1 mica+niobium/tin oxide 100 g of mica with a particle size of from 1 to 15 μm are suspended in 2 l of deionized water and the suspension is heated to 75° C. A solution of 3.1 g of $NbCl_5$ and 65 ml of HCl (w=35%) in 360 ml of water, and a solution consisting of 216 g of $SnCl_4$ (w=60%, d=2) and 65 ml of HCl (w=35%) in 250 ml of water, are added simultaneously but separately at a pH of 2.1. During this procedure the pH is kept constant with NaOH.

When coating has ended, the coated pigment is filtered off with suction, dried and calcined for 0.5 h. A bright pigment is obtained.

| Calcining temperature [°C.] | 400 | 600 | 800 | 400 | 600 | 800 |
|---|---|---|---|---|---|---|
| Atmosphere | Air | Air | Air | Air | Air | Air |
| Powder resistance [$10^6 \Omega \cdot$ cm] | 2.4 | 1.3 | 1.9 | 9.8 | 5.7 | 0.97 |

To determine the specific resistance, about 1.5 g of pigment are compressed between two metal dies in an acrylic glass tube of diameter d with the aid of a 10 kg weight, and the electrical resistance R which arises is measured. The specific power resistance is obtained from the layer thickness L of the compressed pigment (corresponding to the distance between the metal dies) by $$\rho = R \cdot \frac{\pi \cdot (d/2)^2}{L} [\Omega \cdot cm].$$

Example 2
SiO$_2$ flakes+niobium/tin oxide 50 g of SiO$_2$ flakes with a particle diameter of from 2 to 50 μm are suspended in 2 l of deionized water and the suspension is heated to 75° C. Then, at pH=2.0, a solution consisting of 87 g of SnCl$_4$·5 H$_2$O and 1.47 g of NbCl$_5$ in 400 ml of water is added dropwise. The pH is kept constant by the simultaneous metered addition of NaOH.

When coating has ended, the coated pigment is filtered off with suction, washed and dried. Finally, the product is calcined for 1 h in a nitrogen atmosphere. A bright pigment is obtained.

| Calcining temperature [°C.] | 300 | 400 | 500 | 600 | 700 |
|---|---|---|---|---|---|
| Powder resistance [$10^6 \Omega \cdot$ cm] | 8.3 | 16 | 26 | 10 | 5 |

Example 3
mica+tantalum/titanium oxide 200 g of mica having a particle size of 1–15 μm are suspended in 2 l of deionized water and the suspension is heated to 75° C. The pH is adjusted to 2.2 with HCl. Subsequently, a solution of 3.24 g of TaCl$_5$, 70 ml of HCl (w=37%) in 642 ml of TiCl$_4$ solution (370 h of TiCl$_4$/H$_2$O) is added with simultaneous metered addition of NaOH for pH stabilization.

After the end of the addition the reaction mixture is filtered with suction and the solid product is washed with water, dried and calcined at 850° C. for 0.5 h. The cream-colored pigment has a specific powder resistance of 12·10$^6$ Ω•cm.

What is claimed is:

1. A conductive pigment, comprising a platelet-shaped or needle-shaped substrate coated with a conductive layer, wherein the conductive layer is tin oxide doped with niobium and/or tantalum or titanium dioxide doped with niobium- and/or tantalum.

2. A conductive pigment according to claim 1, wherein the content of niobium and/or tantalum in the conductive layer is 0.1–20 atom %.

3. A conductive pigment according to claim 1 wherein the content of doped tin oxide or titanium dioxide relative to the substrate is 25–100% by weight.

4. A conductive pigment according to claim 1 wherein the substrate is platelet-shaped.

5. A conductive pigment according to claim 4, wherein the platelet-shaped substrate is mica, synthetic mica, SiO$_2$ flakes, TiO$_2$ flakes, Al$_2$O$_3$ flakes, glass flakes, or a pearl luster pigment.

6. A conductive pigment according to claim 1 wherein the conductive layer is additionally doped with antimony.

7. A conductive pigment according to claim 1 wherein the substrate is a mixture of platelet-shaped and needle-shaped particles or of platelet-shaped and spherical particles.

8. The conductive pigment of claim 1, which is an opaque pigment.

9. The conductive pigment of claim 8, which provides a pale-colored, decorative effect.

10. The conductive pigment of claim 1, wherein the substrate is a pearl luster pigment.

11. The conductive pigment of claim 10, wherein the substrate is mica, optionally coated with a colored or colorless metal oxide.

12. The conductive pigment of claim 1, wherein the pigment has a specific resistance of from $1 \cdot 10^4$ to $1 \cdot 10^8$ Ω•cm.

13. A process for preparing the pigment according to claim 1, which comprises simultaneously combining an aqueous substrate suspension, a hydrolyzable tin salt or titanium salt solution and an aqueous niobium compound and/or tantalum compound, the pH being maintained, by simultaneous addition of a base or an acid, within a range which brings about the hydrolysis of the salts, and a coated substrate resulting therefrom is separated off, washed, dried and calcined at a temperature of from 200–1100° C. in the absence of oxygen.

14. The process according to claim 13, wherein an aqueous antimony compound is added to the aqueous niobium compound and/or tantalum compound.

15. A varnish, paint, printing ink or plastic composition comprising a conductive pigment according to claim 1.

16. A pigment mixture of 2 or more pigments wherein one pigment is the conductive pigment according to claim 1.

* * * * *